US012466630B2

United States Patent
Thornton et al.

(10) Patent No.: US 12,466,630 B2
(45) Date of Patent: *Nov. 11, 2025

(54) FIBER-BASED SEPARATOR FOR COMPARTMENTALIZED COMPOSITE CAN

(71) Applicant: Sonoco Development, Inc., Hartsville, SC (US)

(72) Inventors: Michael L. Thornton, Fort Mill, SC (US); R. Michael Schock, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 1025 days.

This patent is subject to a terminal disclaimer.

(21) Appl. No.: 14/518,275

(22) Filed: Oct. 20, 2014

(65) Prior Publication Data

US 2016/0107817 A1    Apr. 21, 2016

(51) Int. Cl.
*B65D 81/32* (2006.01)
*B65D 8/00* (2006.01)
(Continued)

(52) U.S. Cl.
CPC ......... *B65D 81/3216* (2013.01); *B65D 15/06* (2013.01); *B65D 85/36* (2013.01);
(Continued)

(58) Field of Classification Search
CPC ............................ B65D 81/32; B65D 81/3216; B65D 81/3233; B65D 81/3222; B65D 77/0486; B65D 77/0453; B65D 77/04; B65D 85/36; B65D 85/328; B65D 85/00; B65D 85/22; B65D 85/60; B65D 85/62; B65D 85/72; B65D 85/74; B65D 85/76; B65D 85/78; B65D 2581/3432; B65D 75/40; B65D 65/42; B65D 65/38; B65D 5/48028; B65D 5/48; B65D 81/325; B65D 81/2053; B65D 86/36; B65D 15/12; B65D 15/20;
(Continued)

(56) References Cited

U.S. PATENT DOCUMENTS 1,595,385 A * 8/1926 Cusack ................. B65D 81/18
206/205
1,713,301 A * 5/1929 Rosskam ............... B65D 25/04
206/584
(Continued)

FOREIGN PATENT DOCUMENTS

GB         819960 A  *  9/1959  ............... B65D 3/24

OTHER PUBLICATIONS

First Canadian Office Action issue in application No. 2,909,114 on Nov. 17, 2021; 6 pages. [Only new art cited here in; U.S. Pat. No. 6,092,717 was previously cited by applicant in IDS filed on Dec. 15, 2015].

(Continued)

*Primary Examiner* — Erik Kashnikow
*Assistant Examiner* — Ashley Axtell
(74) *Attorney, Agent, or Firm* — Nelson Mullins Riley & Scarborough LLP

(57) ABSTRACT

A paper fiber-based partition or divider for use in dividing or separating products in a container that house different products is provided. A separate product container for housing one of the products may be utilized.

19 Claims, 2 Drawing Sheets

(51) Int. Cl.
  *B65D 25/04* (2006.01)
  *B65D 77/04* (2006.01)
  *B65D 85/36* (2006.01)
  *B65D 81/20* (2006.01)

(52) U.S. Cl.
  CPC .......... *B65D 81/2053* (2013.01); *Y02A 40/90* (2018.01); *Y02W 90/10* (2015.05)

(58) Field of Classification Search
  CPC .. B65D 3/24; B65D 2217/02; B65D 2217/04; A23V 2200/08; A21D 10/02; A21D 10/025; Y10S 206/83; B65C 2217/02; B65C 2217/04
  USPC .......... 206/568, 539, 540, 561, 756; 426/86, 426/106, 112, 113, 114, 115, 120, 395; 220/500, 510, 526, 529, 528, 530, 531, 220/532, 533, 534, 541, 545, 551, 554; 428/34.2; 215/6; 229/120.32
  See application file for complete search history.

(56) References Cited

U.S. PATENT DOCUMENTS

| | | | | |
|---|---|---|---|---|
| 1,754,524 A * | 4/1930 | Porter | ...................... | B65D 3/06 206/219 |
| 1,793,526 A * | 2/1931 | Stern | ........................ | B65D 3/22 206/223 |
| 2,058,662 A * | 10/1936 | Broeg | ..................... | A21B 3/132 229/5.82 |
| 2,321,660 A * | 6/1943 | Courtney | ........... | B65D 5/48048 222/454 |
| 2,324,670 A * | 7/1943 | Bergen | .................. | B65D 5/705 210/406 |
| 2,662,017 A * | 12/1953 | Winters | .................. | B65B 61/20 426/120 |
| 2,864,546 A * | 12/1958 | Aldington | .......... | B65D 43/0233 229/404 |
| 2,949,369 A * | 8/1960 | Zoeller | .................... | B65D 3/00 206/568 |
| 3,015,429 A * | 1/1962 | Morici | ..................... | B65D 3/24 206/459.5 |
| 3,023,926 A | 3/1962 | Wilke | | |
| 3,323,706 A | 6/1967 | Gereke | | |
| 3,561,664 A * | 2/1971 | Palmer | ................. | B65D 85/816 206/217 |
| 3,851,757 A | 12/1974 | Turpin | | |
| 3,933,297 A * | 1/1976 | Carlsson | .................. | B65D 5/12 229/125.17 |
| 3,962,476 A | 6/1976 | Turpin | | |
| 4,114,784 A | 9/1978 | Hough et al. | | |
| 5,242,077 A | 9/1993 | Smith et al. | | |
| 5,950,913 A * | 9/1999 | Rea | .......... | B65D 3/24 206/499 |
| 6,092,717 A | 7/2000 | Lowry | | |
| 6,478,181 B1 | 11/2002 | Krupa et al. | | |
| 6,500,475 B1 * | 12/2002 | Kraklow | .............. | A21D 10/025 426/275 |
| 2007/0164045 A1 * | 7/2007 | Wydler | .............. | B65D 77/2072 222/106 |
| 2008/0286420 A1 * | 11/2008 | Domingues | ............ | A21D 6/001 426/111 |
| 2010/0176130 A1 * | 7/2010 | Kim | .................... | B65D 43/0212 220/254.1 |
| 2011/0280998 A1 | 11/2011 | Lorence et al. | | |
| 2013/0129874 A1 * | 5/2013 | Fenske | ............... | B65D 81/2053 426/128 |
| 2014/0305818 A1 * | 10/2014 | Lee | .................... | B65D 51/2835 206/222 |

OTHER PUBLICATIONS

U.S. Non-Final Office Action for U.S. Appl. No. 17/537,565; dated Feb. 2, 2024; 26 pages.

* cited by examiner

FIBER-BASED SEPARATOR FOR COMPARTMENTALIZED COMPOSITE CAN

FIELD OF THE INVENTION

The present invention relates generally to dividers for use in dividing or separating products in a compartmentalized container.

BACKGROUND OF THE INVENTION

Dividers are often used in containers, such as cans, that house food products. In some containers, it is important to separate sections of the container into compartments in order to prevent cross contamination of the contained products. Dividers provide a means of separating the food products placed inside these containers, thereby creating a barrier to avoid contact between the food products.

For example, one commercially available cinnamon roll container may contain a portion for housing dough (dough compartment) and portion for housing icing (icing compartment). The dough compartment will be configured to contain a number of pre-formed doughy components ready for baking into separate cinnamon rolls. The dough compartment does not typically contain a separate container for housing the dough. Instead, a consumer will have direct access to the doughy components upon opening the container and may remove them for use, such as baking.

The icing compartment, however, typically will contain a separate housing or container in which the icing is held. For example, the icing compartment may contain a separate rigid container having a removable divider, such as a metal lid or top, for containing the icing component within the rigid container. In certain embodiments, the icing compartment may house a closed flexible, plastic bag housed with icing. The metal lid or top on the rigid icing container and the closed aspect of the plastic bag prevent the icing from contaminating the dough housed in the dough compartment of the container. In addition, the use of a separate, closable container to contain the icing allows the consumer to remove the icing from the main container and use it to coat freshly baked rolls as described below. When a plastic bag houses the icing, a divider may still be employed to maintain structure of the icing in the bag and to prevent the dough resting on top of the icing to crush and potentially cause a leak of icing from the closed plastic bag.

Most such exemplary cinnamon roll containers are formed from paper or paper-containing components and are generally cylindrical tubes with, typically, metal end caps. When the cinnamon rolls are ready for baking, the paper tube is opened to reveal access to the dough and the icing container. The dough components and the icing container are then removed from the tube. The dough components are placed on a baking sheet and baked. The top of the icing container is removed to allow access to the icing. After the dough is baked, icing from the lid-removed icing container is then spread over the top of the baked dough to create a finished cinnamon roll.

If a cover or top were not employed on the icing container during storage, the dough in the can, which is not typically maintained within a separate container, would likely become contaminated with icing. Without the use of a separator, such as a cover or top, the dough and icing would touch prematurely, thus creating a mess for the consumer upon opening of the container. Moreover, when baked, the dough that has been contaminated with icing, which typically contains large amounts of sugar, may burn in the oven and result in an unappealing meal.

However, the use of such known metal dividers has created several problems. For example, the metal divider, due to its rigidity and inflexibility, may tip or not seat correctly during separator insertion. In addition, unless formed of a non-rusting metal, a metal divider has the potential to rust, which is undesirable in the context of food product containers. Obviously, rust is not only undesirable from an appearance standpoint, but can contaminate the housed products which it contacts. Also of concern is the fact that some of the metal dividers used today may have a coating containing bisphenol A. In the case of known plastic dividers, which also may be replaced by the present invention, the plastic dividers may be made from polymers that include bisphenol A. Bisphenol A is a known endocrine disruptor that has been shown to cause negative health effects in animal studies. Moreover, the separator insertion process is typically a source of frustration for the packer because, based on the environment, the paper-based composite cans often shrink and grow at different rates than the employed metal or plastic separator.

Other compartmentalized containers are known in the prior art. One such container is shown in U.S. Pat. No. 3,962,476, which is a two compartment package comprising an outer spirally wound fiber can containing a dough product in one compartment separated from a second compartment by a flat metal separator member positioned transversely and engaging the inside wall of the container. On the other side of the separator is an icing cup that engages the walls of the container at its open end which faces the separator plate.

Another container is shown in U.S. Pat. No. 3,323,706 and is a combination liquid and food particle container, and more specifically, a combination popcorn container top-mounted to a drinking cup. A flat paper partition of slightly larger diameter than the walls of the container is provided for insertion through the upper compartment of the container so that when the partition is pressed into position, it will remain therein and support the popcorn or other food product. The paper partition separates the container into a lower drink compartment and an upper food compartment. A straw is inserted into an opening in the partition so that the user can drink the drink housed below the separated popcorn.

Another compartmentalized container is shown in U.S. Pat. No. 4,114,784 that includes a snap-fit separator member. The container is a closed container used for housing a plurality of biscuit or dough units in part of the container and then a cup-shaped member containing a product such as a powder, frosting mix, icing, jelly, honey, butter, margarine, etc. in the other part of the tubular container. The two products are separated by a separator formed from a sheet metal that includes a central disk portion and a deformed neck portion. A rigid support disk of paperboard, metal, paper/foil laminate, or the like that has a diameter corresponding to the internal diameter of the tubular container is placed on top of the sheet metal separator to support the dough product. In this arrangement, the following items, in this order, are housed in a tubular closed compartmentalized can: 1) first product such as dough; 2) partition divider (which could be paperboard and/or paper/foil laminate); 3) metal separator with deformed neck portion; and 4) second product housed in a cup-shaped container.

U.S. Pat. No. 5,242,077 shows a removable friction fit container partition that divides a container into two compartments. The particular partition is used in a container where a food product, such as a powdered soup, is placed below the partition and then an individually wrapped product is placed on top of the partition. The partition comprises a thin foam (e.g., polyethylene foam) disk and a circular paper disk, wherein the paper disk may include a protective wax or plastic coating on its exposed face to retard moisture migration.

U.S. Pat. No. 6,092,717 is directed to a tubular container with independently openable compartments. The container is described as being a tubular composite that is often used for storing food items such as chips. The second, lower, compartment houses the same type of product that is in the first, upper, compartment. The container includes a divider that separates the two compartments so as to partition the body into two tubular compartments on opposite sides of the divider. The divider may be formed from a flexible material such as paper, paperboard, polymer film, metal foil, or laminations of two or more such materials. The divider is secured within the body by adhesively sealing the divider to the interior walls of the tube.

SUMMARY OF THE INVENTION

A principal object of the present invention is to provide a divider capable of separating two different products that require separation when housed and/or stored. The present invention may be employed in almost any environment where two products require separation, including where one of the products is in a separate open container with the product contained exposed. In particular, the present invention may replace metal or plastic dividers used in containers that house two different products and that compartmentalize the container into separate product-containing spaces. The present fiber-based divider is flexible, thereby lessening problems previously observed in tipping and incorrect seating of the divider in the composite can during press fitting into the can. Because the fiber-based divider is comprised of primarily papermaking fibers and components, it avoids problems associated with metal dividers, such as rust, and with rigid plastic dividers, such as inflexibility. The use of a fiber-based divider is also less costly to use relative to metal and plastic dividers and has the added advantage of using sustainable technology from an environmental aspect.

In a first embodiment, the present invention provides a container for housing at least two different products in a separated environment wherein the container has a container housing; a first closed end and a second closed end; at least a first product and a second product within the container housing, wherein the first product is different from the second product, wherein the first product is located within the container housing adjacent to the first closed end and wherein the second product is located within the housing adjacent to the second closed end; and at least one divider comprising more than 50% papermaking fibers and located within the container housing between the first product and the second product so as to separate the first product from the second product.

In other embodiments, the invention may include a separate product container for housing the second product, which may then be covered by the divider to provide for the separation. The divider may be larger than the open end of the separate product container housing the second product and may be press fit or adhesively adhered to the separate product container.

In yet other embodiments, the container may house a third product, either in a separate product container or not, and include a second divider, wherein the second divider separates the third product and is adjacent either the first product or adjacent the second product and separates the third product from either the first product or the second product. The second divider may be adjacent both the first product and the second product and separate the first product from the third product and the third product from the second product.

It should be appreciated that additional multiple dividers may be employed within the container housing for separating multiple products, but that any dividers employed are primarily composed of papermaking fibers. Moreover, it should be appreciated that when more than two products are housed within the container, one, two, or more dividers of the type described may be employed. However, while multiple dividers and multiple types of products may be used in the present invention, the container will only be composed of a container housing, products, at least one divider made of papermaking fibers, and, optionally, a separate product container(s).

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention provides an effective means to ensure that little or no contact is made between products, such as food products, that are housed in the separate compartments or portions of a container, such as a composite can.

In addition, the present inventive fiber-based divider is effective when used with containers housing food products such as dough, which has a tendency to expand when housed in a container for long periods. The flexibility of the inventive fiber-based divider may expand and contract at rates that are commensurate with the expansion and contraction rates of a paper-based main container. Thus, problems with bulging or loosening are lessened when employing the present fiber-based divider.

While the present invention is described primarily in the context of a divider for separating food products in a can, it is to be appreciated that the divider could be employed to separate other types of products and in other types and configurations of containers. It should also be appreciated that while the container is described as a cylindrical can and the divider and separate product container are described as being circular and cylindrical, various shapes and sizes, including square, rectangular, boxed, pyramidal, etc. may be employed for the container, divider and/or separate product container.

Figure 1:
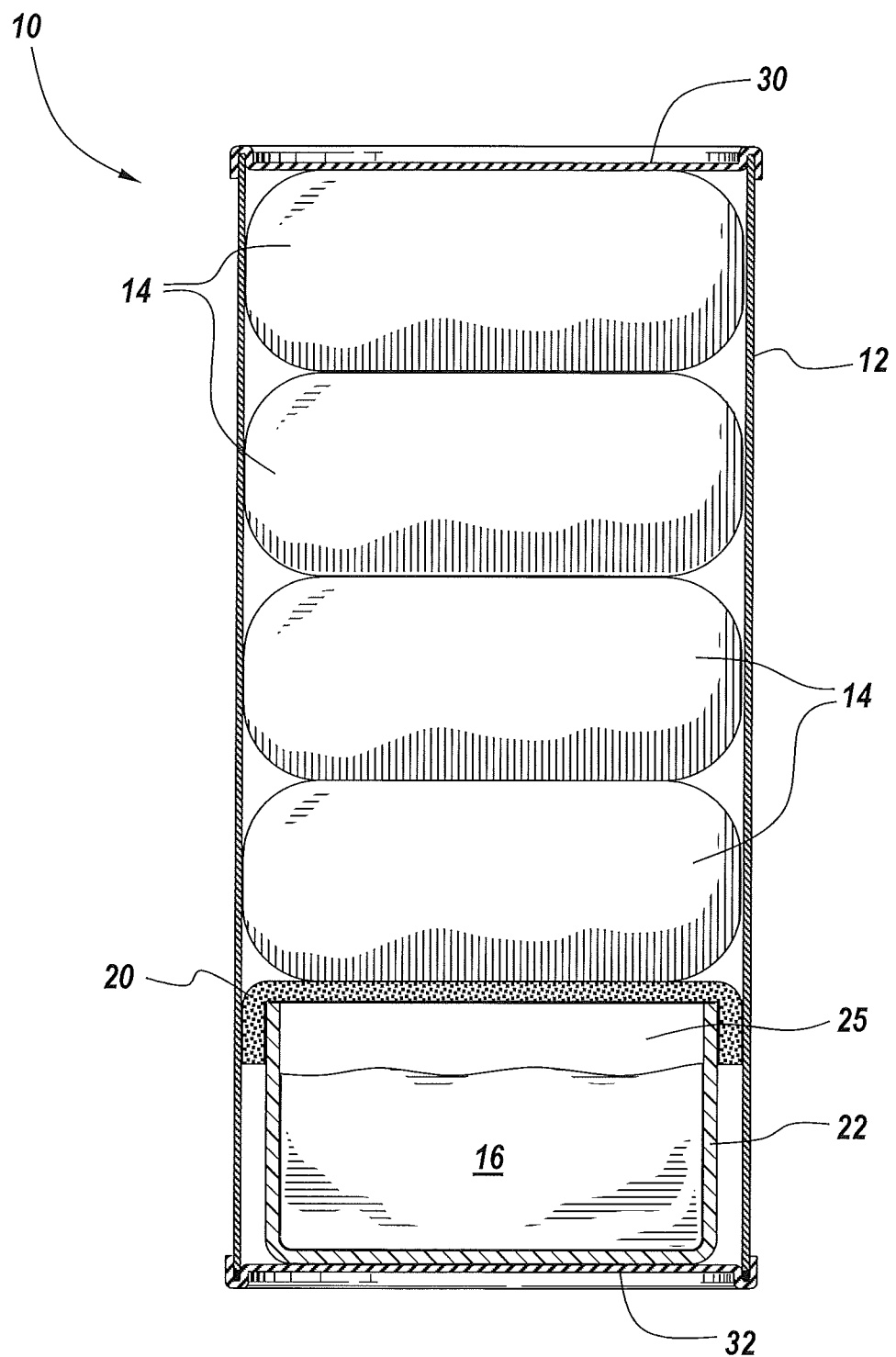
FIG. 1 is a cross section side view of a compartmentalized cylindrical container with the divider of the present invention inside the can along with two different products.
Figure 2:
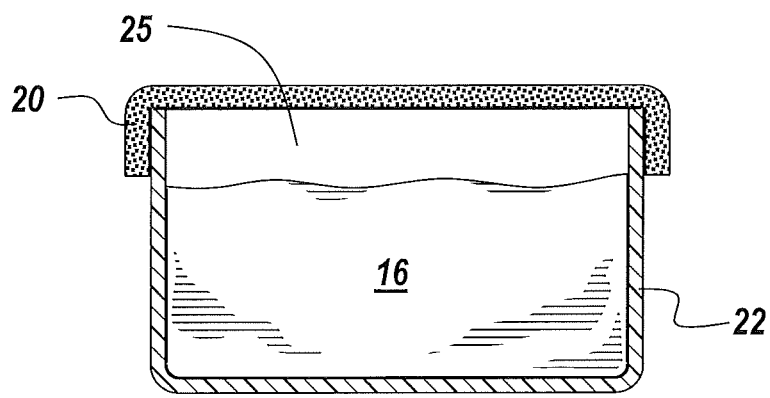
FIG. 2 is a cross section side view of an embodiment of the separate product container with the divider of the present invention.
Figure 3:
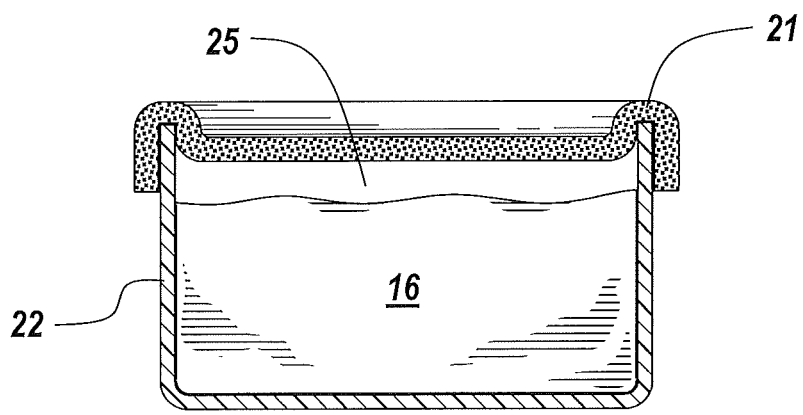
FIG. 3 is a cross section side view of another embodiment of the divider of the present invention and separate product container.

In one embodiment shown in the drawings, particularly in FIG. 1, a container 10 contains two different food products 14 and 16 and the divider 20 of the present invention. More specifically, container 10 includes a container housing 12, a first end 30, a second end 32, a first product 14, a second product 16 that is different than the first product 14, a fiber-based divider 20, and a separate product container 22. First end 30, when the container is filled and completed will be a first closed end 30, and second end 32, when the container is filled and completed will be a second closed end 32. FIG. 2 shows the divider 20 and separate product container 22 depicted in FIG. 1 and FIG. 3 shows an alternate divider 21 for the divider 20 depicted in FIG. 1.

As shown in the Figures, a separate product container 22, such as a cup or other open-ended product housing, may be utilized to house a second product 16 that is different from the first product 12. Separate product container 22, however, may be unnecessary for use in certain storage environments in the context of the present invention and may be deleted when unnecessary. For example, the inventive container system may merely be composed of a container 10, two different products 14 and 16, first and second ends 30 and 32 and a divider 20 that separates the first product 14 from second product 16.

In the exemplary container 10 depicted in the Figures, however, a separate product container 22 is covered by a divider 20 (or 21 in the FIG. 3 embodiment) in order to separate a first product 14 from a second product 16. In the particular arrangement show in the Figures, pre-baked cinnamon rolls dough nuggets comprise the first product 14. Icing to be spread on the dough nuggets after baking is the second product 16 and it is a product that is different than first product 14. As is the case with most containers where two different products are housed, there is a need to keep the products separated or compartmentalized until the container is opened and the products are readied for use. This is particularly true when the products are food products and cross contamination could result in spoilage, alteration of the taste, or burning after cooking if the components meet in the prebaked stage.

The icing in the particular embodiment shown in the Figures is housed in an open top cup that is the separate product container 22. These types of cups may be formed from plastic or any other suitable material that allows for its use in the inventive container. Plastics such as polyolefins, polyethylene, polypropylene, and the like may be used for forming the separate product container. In addition, separate product container may, like the divider 20 be formed from papermaking fibers, either in whole, or in part. Separate product container 20 may also be formed from the same material as container housing 12 or first and second ends 30 and 32. The only requirements for separate product container are that the container be open ended, fit within the confines of container 10, be suitable for housing second product 16 and be capable of receiving a divider 20 in order to cover the open end 25 of the separate product container 22 so as to allow division between first product 14 and second product 16.

The divider 20, or alternative divider 21, covers the open end 25 of the separate product container 22. In the Figures, the container housing 12 and separate product container are cylindrical and the divider 20, and alternative divider 21, are circular. However, other shapes could be employed for the container housing 12, separate product container 22, if utilized, and the dividers 20 and 21.

In addition to various shapes, dividers 20 and 21 may have any thickness and may have a constant or a varying thickness. Particular thicknesses that have been found appropriate are 0.0018" and 0.0021". However, various embodiments may employ dividers that are thinner or thicker than the examples described above. The particular environment and use, as well as the dividing or separating capability of the particular fiber-based divider, will dictate the thickness that is appropriate. Moreover, the fiber-based divider can be engineered for particular environments and uses. For example, the stiffness and/or other performance characteristics can be enhanced when needed. One method of enhancing the stiffness of the fiber-based divider is to emboss it with ridges to obtain the improved stiffness. The interplay of such engineered characteristics into the fiber-based divider may allow for variances in the thickness of the divider necessary for the particular environment.

Various other engineered characteristics or enhancements can be added to the fiber-based divider. For example, certain profiles may increase buckle resistance. Moreover, the divider may be printed with coupons, various codes, or any graphics that could, for example, be the trademarks or other representations for the company selling the housed product.

Containers in which the present inventive divider will be utilized may be formed from a paper-based material that is more economical to form and commercialize. Container housing 10 may be composed of fiber and be wound spirally into a tubular-shaped container. One exemplary spirally-wound construction for container housing 12 is shown in U.S. Pat. No. 3,851,757. The container 10 may be pressurized, for example to between 10 and 50 psi. However, the container 10 may be formed from any material that is suitable for housing the first and second products 14 and 16. In addition, the first and second ends 30 and 32 of container 10 may be formed from any material known in the art. In certain embodiments, such as those exemplified herein, the first and second ends 30 and 32 may be formed from a metal product such as aluminum or a rust-free metal. They may be metal discs or the like. However, any other materials suitable for use in the particular environment may be utilized. Such container and end materials are well known in the art and the invention hereof is not limited to a certain material for forming container 10, container housing 12, first and second ends 30 and 32 or separate product container 22.

The relevant materials, however, for forming the divider 20 of the present invention are paper-making fibers. Paper-making fibers are well known and may include any cellulosic fibers that are known to be useful for making paper. The most common papermaking fibers include virgin softwood and hardwood fibers, as well as secondary or recycled cellulosic fibers. It is not required that the paper-based dividers of the present invention be made from only paper-making fibers. Obviously, additives such as adhesives and the like will be required as well as various other paper formation chemicals. In addition, it is not required that the base component of the paper based dividers of the present invention be 100% papermaking fibers. Instead, other components, such as metals, plastics, and the like may be utilized according to the present invention, provided papermaking fibers comprise more than 50% of the base material for making the dividers. For example, the dividers may be comprised of 100%, 90%, 80%, 75%, 70%, 60% and 55% papermaking fibers, and all ranges between 51% and 100% (with respect to the base material).

The divider 20 may be coated with various coatings that provide moisture resistance as well as other features to the divider. One such coating can contain a wax. Other coatings can be formed from various known polyolefins and/or BPA non-intent resins. Moreover, the fiber-based divider, itself, may be formed from a moisture resistant paper product. When a coating is employed, the divider may be coated around its edges with an adhesive wherein the adhesive coated side of the divider 20 is adhered to the walls of separate product container 22 as described below. The divider 20 may also be adhered, or press fit, to the interior of container housing 12 to ensure an even tighter fit.

The divider 20 may rest flatly across the top of the open end 25 of separate product container 22 so that the divider edges extend to the exterior edge of the separate product container 22 (not shown) or may, as shown in FIGS. 1 and 2, extend past the exterior edge of the separate product container 22, thus allowing divider 20 to overhang the edges of the separate product container 22. In an alternative embodiment shown in FIG. 3, divider 21 is formed onto the open end 25 of the separate product container 22 so as to create a depression that allows more of a fit of the overhanging divider 21 edges onto the exterior walls of separate product container 22.

In addition, it will be understood that dividers 20 and 21 may be attached to the open end 25 of separate product container 22, for example by adhesives (food grade adhesive, if food is being housed in container 10) or by mechanical press fitting as is shown in FIG. 3.

When the container 10 is loaded in the arrangement in the context of a cinnamon roll product, the separate product container 22 will be loaded with a second product 16 such as a paste-like product such as icing. The fiber-based divider 20 may be placed onto, or attached, to the open end 25 of separate product container 22 either before or after the filled separate product container 22 has been inserted into container 10. If divider 20 has been placed or attached onto separate product container 22 before insertion of the filled product container 22 into container 10, then the combination of divider 20 and separate product container 22 will be placed into or inserted into container housing 12 adjacent second end 32. It should be understood that "adjacent" as used herein does not require that an article actually touch another article to which it is "adjacent". Instead, "adjacent" is used herein only to show relative positioning of articles. For example, the fact that first product 14 is "adjacent" to first closed end 30 and that second product 16 is "adjacent" to second closed end 32 simply means that first product 14 is closer to first closed end 30 than second product 16 and vice versa.

In other embodiments, separate product container 22 may be filled with second product 16 and placed into container housing 12 before placement of divider 20 onto open end 25 of separate product container 22. In that instance, after placement of filled separate product container into container housing 12 adjacent second end 32, which is typically closed before any product insertion, divider 20 will then be inserted into container housing 12 to cover the open end 25 of filled separate product container 22.

Once the divider 20 and filled separate container 22 are present in container 10, the first product 14 may then be placed or inserted into container 10. The presence of divider 20 operates to ensure that no contact is made between the first product 14 and the second product 16 after both have been inserted into container 10. After first product 14 is placed into container 10, the container housing 12 then receives a closing device, such as a first end 30 so that the first and second products 14 and 16 are contained within container 10 for shipment and sale.

The present container 10 with paper-based divider 20 is useful for housing and separating products other than dough and icing. One of ordinary skill in the art would appreciate that other food products can be used, as well as other non-food products. For example, one of first product 14 or second product 16 may be a dry, granular product (such as cinnamon, sugar, sprinkles) and the other of the products may be a liquid or paste (such as yogurt, pudding, cream).

Moreover, non-food products can be housed within container 10, provided separation between the products is desired. For example, first product 14 may be bolts and second product 16 may be nuts for the bolts. Moreover, first product 14 and second product 16 may be the same product, but have different characteristics. For example, first product 14 might be bungee cords that are all two feet in length and second product 16 might be identically-constructed bungee cords that are all three feet in length. The only requirement for determining the products to be housed is that first product 14 must be different in some way from product 16. That difference could, for example, merely be a difference in color of the products.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to description of the version therein.

What is claimed is:

1. A container for housing at least two different products in a separated environment, the container, consisting essentially of:
   a container housing, the container housing having a first closed end and a second closed end;
   at least a first product and a second product within the container housing, wherein the first product is different from the second product, wherein the first product is located within the container housing adjacent to the first closed end and wherein the second product is located within the housing adjacent to the second closed end;
   a separate product container housing the second product and located adjacent to the second end and wherein the separate product container comprises at least one open end; and
   at least one removable, flexible divider comprising more than 50% papermaking fibers and located within the container housing between the first product and the separate product container housing so as to separate the first product from the second product, wherein the at least one removable, flexible divider is sized to be larger than the exterior size of the separate product container and is placed onto the at least one open end of the separate product container such that the at least one removable, flexible divider overhangs an edge of the separate product container, wherein the at least one removable, flexible divider is adhered onto the at least one open end of the separate product container and adhered to the walls of the interior of the container housing, and wherein the first product is separated from the second product until the at least one removable, flexible divider is removed from the separate product container.

2. The container of claim 1, wherein the at least one removable, flexible divider is coated with a moisture resistant coating.

3. The container of claim 2, wherein the moisture resistant coating comprises a wax.

4. The container of claim 1, wherein the at least one removable, flexible divider is located closer to the first closed end than the second closed end.

5. The container of claim 1, wherein the container housing is cylindrically shaped and wherein the at least one removable, flexible divider is circular in shape.

6. The container of claim 5, wherein the at least one removable, flexible divider is of a size to tightly fit within the cylindrically-shaped container housing.

7. The container of claim 1, wherein the container housing and separate product container are cylindrically shaped and the at least one removable, flexible divider is circular.

8. The container of claim 1, wherein the at least one removable, flexible divider is not circular and the separate product container is not cylindrical and the at least one removable, flexible divider and the open end of the separate product container have mating shapes.

9. The container of claim 1, wherein the first product and the second product are food products.

10. The container of claim 9, wherein the first product comprises a dough and the second product comprises an icing.

11. The container of claim 1, wherein the at least one at removable, flexible divider further comprises a thickness between 0.0018-0.0021 inches.

12. The container of claim 1, wherein the at least one removable, flexible divider further comprises ridges for enhancing a stiffness of the at least one divider.

13. The container according to claim 1, wherein the at least one removable, flexible divider comprises a depression extending partially into the separate product container.

14. The container according to claim 1, wherein the at least one removable, flexible divider overhangs an exterior edge of the separate product container.

15. The container according to claim 14, wherein a portion of the at least one removable, flexible divider which overhangs the exterior edge of the separate product container is in contact with both the exterior edge of the separate product container and the interior of the container housing.

16. The container according to claim 1, wherein the at least one removable, flexible divider is press fit onto the separate product container.

17. The container according to claim 1, wherein the at least one removable, flexible divider is press fit to the interior of the container housing.

18. The container according to claim 1, wherein the at least one removable, flexible divider may expand and contract.

19. The container accordingly to claim 1, wherein a first surface of the at least one removable, flexible divider is adhered onto the at least one open end of the separate product container and a second surface of the at least one removable, flexible divider is adhered to the walls of the interior of the container housing.

* * * * *

UNITED STATES PATENT AND TRADEMARK OFFICE
CERTIFICATE OF CORRECTION

| | | |
|---|---|---|
| PATENT NO. | : 12,466,630 B2 | Page 1 of 1 |
| APPLICATION NO. | : 14/518275 | |
| DATED | : November 11, 2025 | |
| INVENTOR(S) | : Michael L. Thornton and R. Michael Schock | |

It is certified that error appears in the above-identified patent and that said Letters Patent is hereby corrected as shown below:

In the Claims

Claim 1, Column 8, Line 66, should read --product container-- and not "product housing container"

Signed and Sealed this
Thirteenth Day of January, 2026

John A. Squires
*Director of the United States Patent and Trademark Office*